US012581208B2

(12) United States Patent
Zeitoun

(10) Patent No.: US 12,581,208 B2
(45) Date of Patent: Mar. 17, 2026

(54) PLENOPTIC IMAGING DEVICE WITH A VIRTUAL INTERMEDIATE IMAGE

(71) Applicants: ECOLE POLYTECHNIQUE, Palaiseau (FR); CENTRE NATIONAL DE LA RECHERCHE SCIENTIFIQUE, Paris (FR); ECOLE NATIONALE SUPERIEURE DE TECHNIQUES AVANCEES, Palaiseau (FR)

(72) Inventor: Philippe Zeitoun, Paris (FR)

(73) Assignees: ECOLE POLYTECHNIQUE, Palaiseau (FR); CENTRE NATIONAL DE LA RECHE SCIENTIFIQUE, Paris (FR); ECOLE NATIONALE SUPERIEURE DE TECHNIQUES AVANCES, Palaiseau (FR)

( * ) Notice: Subject to any disclaimer, the term of this patent is extended or adjusted under 35 U.S.C. 154(b) by 72 days.

(21) Appl. No.: 18/698,772

(22) PCT Filed: Oct. 5, 2022

(86) PCT No.: PCT/EP2022/077682
§ 371 (c)(1),
(2) Date: Apr. 4, 2024

(87) PCT Pub. No.: WO2023/057502
PCT Pub. Date: Apr. 13, 2023

(65) Prior Publication Data
US 2024/0430585 A1      Dec. 26, 2024

(30) Foreign Application Priority Data
Oct. 6, 2021    (FR) ...................................... 2110579

(51) Int. Cl.
*H04N 23/957* (2023.01)
*H04N 23/30* (2023.01)
(Continued)

(52) U.S. Cl.
CPC ........... *H04N 23/957* (2023.01); *H04N 23/30* (2023.01); *H04N 23/55* (2023.01); *H04N 23/67* (2023.01)

(58) Field of Classification Search
CPC ...... H04N 23/957; H04N 23/30; H04N 23/67; H04N 23/55
USPC ....................................... 348/222.1
See application file for complete search history.

(56) References Cited

U.S. PATENT DOCUMENTS

2016/0057407 A1      2/2016   Klehm et al.

FOREIGN PATENT DOCUMENTS

WO      WO-2010121637 A1 * 10/2010   ............. H04N 23/55

OTHER PUBLICATIONS

Georgiev, et al., "Superresolution with Plenoptic Camera 2.0", IEEE International Conference on Computational Photography (ICCP), Apr. 2009.
(Continued)

*Primary Examiner* — Joel W Fosselman
(74) *Attorney, Agent, or Firm* — Baker Hostetler

(57) ABSTRACT

A plenoptic imaging device for forming an image of the light field of an object, includes a sample holder suitable for holding the object; a main optical assembly, arranged to focus rays of the light field of the object, at a distance $z_0$, referred to as the object distance, from the sample holder, which distance is smaller than an object focal distance $f_1$ from the main optical assembly so as to form an intermediate optical image $(I_v)$ of the object in an intermediate image plane at a distance $z_1$ from the optical assembly; an assembly for sampling the light field, which assembly is suitable for
(Continued)

acquiring spatiodirectional information on the rays forming the virtual image and for forming the image of the light field.

9 Claims, 4 Drawing Sheets

(51) Int. Cl.
*H04N 23/55* (2023.01)
*H04N 23/67* (2023.01)

(56) References Cited

OTHER PUBLICATIONS

Kipp, et al., "Sharper images by focusing soft X-rays with photon sieves", Nature, 414(6860), pp. 184-188, 2001.

Ng, "Digital Light Field Photography", PhD thesis, Stanford University, CA, USA, 2006.

Lumsdaine, et al., "The focused plenoptic camera", 2009 IEEE International Conference on Computational Photography (ICCP), pp. 1-8, Apr. 2009.

Georgiev, et al., "Superresolution with the Focused Plenoptic Camera", SPIE Electronic Imaging, 7873:1-13, 2011.

Georgiev, et al., "Reducing Plenoptic Camera Artifacts", Computer Graphics Forum, vol. 29, No. 6, pp. 1955-1968, 2010.

Herzog, "Plenoptic imaging : from visible light to X-rays", 2020; retrieved from https://theses.hal.science/tel-03129863.

Sowa, et al., "Plenoptic x-ray microscopy", Appl. Phys. Lett., vol. 116, No. 1, 2020.

* cited by examiner

104

PLENOPTIC IMAGING DEVICE WITH A VIRTUAL INTERMEDIATE IMAGE

CROSS-REFERENCE TO RELATED APPLICATIONS

This application is a National Stage of International patent application PCT/EP2022/077682, filed on Oct. 5, 2022, which claims priority to foreign French patent application No. FR 2110579, filed on Oct. 6, 2021, the disclosures of which are incorporated by reference in their entireties.

FIELD OF THE INVENTION

The present invention relates to the field of plenoptic imaging devices and to the field of X-ray imaging.

BACKGROUND

Conventional digital cameras provide a two-dimensional image of a three-dimensional scene. This two-dimensional image represents the total amount of light illuminating each point on the photodetector within the camera. However, this two-dimensional image contains no information on the direction of the light illuminating the photodetector.

In contrast, plenoptic imaging devices sample the 4D light field delivered by a scene. This 4D light field or radiance is a representation of all the light rays in free space. It is a function $r(q, p)$, where $q$, $p$ are vectors that represent the position and direction of a ray intersecting a plane transverse to the optical axis. In a plenoptic imaging device, the direction of the light field is sampled by measuring the inclination of the rays, for example via a microlens array.

FIGS. 1A and 1D illustrate two plenoptic-imaging-device configurations known to those skilled in the art, denoted the "conventional" configuration and "focused" configuration, respectively.

In the conventional configuration, which is illustrated in FIG. 1A, the device comprises a main objective lens 100, a microlens array 101 and a matrix-array photodetector 102. In this configuration, the microlens array is placed in a plane, i.e.

$$\frac{1}{z_0} + \frac{1}{z_1} = \frac{1}{f_1},$$

with $z_0$ the distance between the object 103 and the main lens 100, $z_1$ the distance between the main lens 100 and the microlens array 101 and $f_1$ the focal length of the main lens. In this way the image of the object, i.e. the intermediate image, is formed directly in the plane of the microlens array 101. In the conventional configuration, the photodetector 102 is placed at a distance b from the microlens array 101 equal to the focal length $f_2$ of each microlens. In this way, the microlens array is focused to infinity. Since the distance $z_1$ between the main lens 100 and the microlens array 101 is much greater than the focal length f, this amounts to saying that the microlens array is focused on the main lens 100. Thus, the image recorded by the photodetector 102 is formed from a plurality of micro-images of the main lens.

As illustrated in FIG. 1B, the microlens array 101 allows spatial components to be separated from angular components. The spatial components are sampled directly by the microlenses because each microlens is associated with a different segment of the image formed by the main lens. The angular components are detected by the pixels of each micro-image 104. Specifically, each microlens separates a beam delivered by the main lens into rays originating from various segments of the aperture of the main lens. Each of these rays is detected by a pixel of the photodetector and the pixels forming each micro-image 104 are associated with various ray angles.

FIG. 1C shows an example of a "raw" plenoptic image or light-field image obtained by a plenoptic device and formed by a set of micro-images, this image being taken from Ren Ng. Digital Light Field Photography. PhD thesis, Stanford University, CA, USA, 2006. AAI3219345 though reference may also be made to Lumsdaine, A. & Georgiev, T. (2009 April). From the angular information contained in this light-field image, it is possible to reconstruct an image focused at a certain depth with refocusing algorithms. To this end, the light field is extracted from the raw plenoptic image and backpropagated into the object space. This step can be carried out in various ways (stereo-estimation, shift-and-sum algorithm, rendering with blending, the "superresolution" method, etc.). The algorithm synthetically mimics the action of focusing on a sensor through optical means, as if the image were acquired by a conventional camera. The resulting image contains the in-focus elements corresponding to the depth of the refocusing, but also the out-of-focus elements of the adjacent depth planes. A reconstruction obtained with the refocusing algorithm has the same properties as those of a conventional photograph: the in-focus elements are reconstructed sharply, while out-of-focus elements are blurred. A precise description of some refocusing algorithms may be found in Ren Ng. Digital Light Field Photography. PhD thesis, Stanford University, CA, USA, 2006. AAI3219345, Todor Georgiev, Georgi Chunev, and Andrew Lumsdaine. Superresolution with the focused plenoptic camera. SPIE Electronic Imaging, 7873:1-13, 2011, or even in Lumsdaine, A. & Georgiev, T. (2009 April). The focused plenoptic camera. in 2009 *IEEE International Conference on Computational Photography (ICCP)* (pp. 1-8). IEEE.

Unlike the conventional configuration, in the focused configuration, the intermediate image is not formed in the plane of the microlens array ML. This array may be placed respectively before or after (as illustrated in FIG. 1B) the intermediate image formed by the main lens. The main difference between the two methods is that, in the focused configuration, the properties of the micro-images vary as a function of the depth of the object in the object space. Thus, the magnification of each micro-image varies as a function of the depth of the object in the object space. In addition, a lateral shift exists in the position imaged by adjacent micro-images as a function of depth. The focused configuration allows a higher spatial resolution but has a lower angular resolution than the conventional configuration (see Lumsdaine, A. & Georgiev, T. (2009 April). The focused plenoptic camera. in 2009 *IEEE International Conference on Computational Photography (ICCP)* (pp. 1-8). IEEE.).

Plenoptic imaging devices theoretically make it possible to reconstruct a 3D image of a sample that is partially transparent to X-rays by refocusing a 2D image of the sample onto various planes. However, in plenoptic imaging devices, which possess resolutions limited by the diffraction of the main lens, the lateral and longitudinal resolutions vary as 1/NA and 1/NA2, with NA the object numerical aperture of the main lens. Now, in the domain of hard X-rays (and therefore at photon energies greater than a few keV), optics currently possess very small numerical apertures (typically less than 0.001). This small numerical aperture thus produces voxels having a depthwise dimension that is greater by several orders of magnitude than the other two dimensions associated with lateral resolution. Reconstruction in 3 dimensions is then very complicated due to a very great loss of longitudinal resolution.

SUMMARY OF THE INVENTION

The invention aims to overcome certain problems of the prior art. To this end, one subject of the invention is a plenoptic imaging device wherein the object is placed between the object focal plane and the main lens in order to create a virtual image placed on the side of the object for the main lens. This new configuration improves lateral, longitudinal and angular resolution and depth of field compared to a prior-art device in focused configuration, this being a major advantage in respect of production of a plenoptic X-ray camera, which currently is very handicapped by the small numerical aperture of X-ray optics. Compared to a prior-art device in conventional configuration, the device of the invention allows lateral and longitudinal resolution to be improved.

To this end, one subject of the invention is a plenoptic imaging device for forming an image of the light field of an object, comprising:
- a sample holder configured to hold said object,
- a main optical assembly, arranged to focus rays of the light field of said object, at a distance $z_0$ called the object distance from the sample holder less than an object focal distance $f_1$ of said main optical assembly, so as to form an intermediate virtual image of said object in an intermediate image plane at a distance $z_1$ from said optical assembly,
- a light-field-sampling assembly configured to acquire spatio-directional information of the rays forming the virtual image and to form said image of the light field.

In one preferred embodiment of the invention, said light-field-sampling assembly comprises:
- a matrix-array photodetector a microlens array arranged at a distance a from the intermediate image plane, the photodetector being arranged at a distance b from the microlens array, each microlens being of diameter $d_2$ and having a focal length $f_2$ and being configured to form a micro-image of a respective portion of the virtual image of the object on a respective segment of the photodetector, each said segment comprising a plurality of pixels, the micro-images forming said image of the light field.

Preferably, in this preferred embodiment, an image numerical aperture $NA_{im,LP}$ of the main optical assembly is less than or equal to an image numerical aperture $NA_{im,ML}$ of each microlens.

Preferably, in this preferred embodiment, the photodetector is in a plane that is conjugated with the intermediate image plane by the microlens array.

Preferably, in this preferred embodiment, $$\frac{d_1}{z_{1+a+b}} = \frac{d_2}{b},$$

with $d_1$ the diameter of the aperture of the main optical assembly.

Preferably, in this preferred embodiment, a distance c between the microlens array and the main optical assembly is greater than said distance $z_1$.

According to one embodiment of the device of the invention, the device comprises a processor configured to implement a refocusing algorithm allowing a depth image or a 3D image of the object to be reconstructed from said image of the light field.

According to one embodiment of the device of the invention, the main optical assembly and the microlens array are configured for X-rays.

According to one embodiment of the device of the invention, the main optical assembly is a photon sieve.

According to one embodiment of the device of the invention, the device of the invention comprises an X-ray source irradiating said object so as to form said light field of the object.

Another subject of the invention is a method of use of a plenoptic imaging device comprising a main optical assembly and a light-field-sampling assembly, said method comprising the following steps:
- placing said device so that a distance $z_0$ called the object distance between an object to be imaged and said main optical assembly is less than an object focal length $f_1$ of said main optical assembly so as to form an intermediate virtual image,
- acquiring, with the light-field-sampling assembly, spatio-directional information of the rays forming the virtual image in order to form an image of the light field of the object.

BRIEF DESCRIPTION OF THE DRAWINGS

Other features, details and advantages of the invention will become apparent on reading the description given with reference to the appended drawings, which are given by way of example and which show, respectively.

In the figures, unless otherwise indicated, the elements have not been drawn to scale.

DETAILED DESCRIPTION

Figure 2:
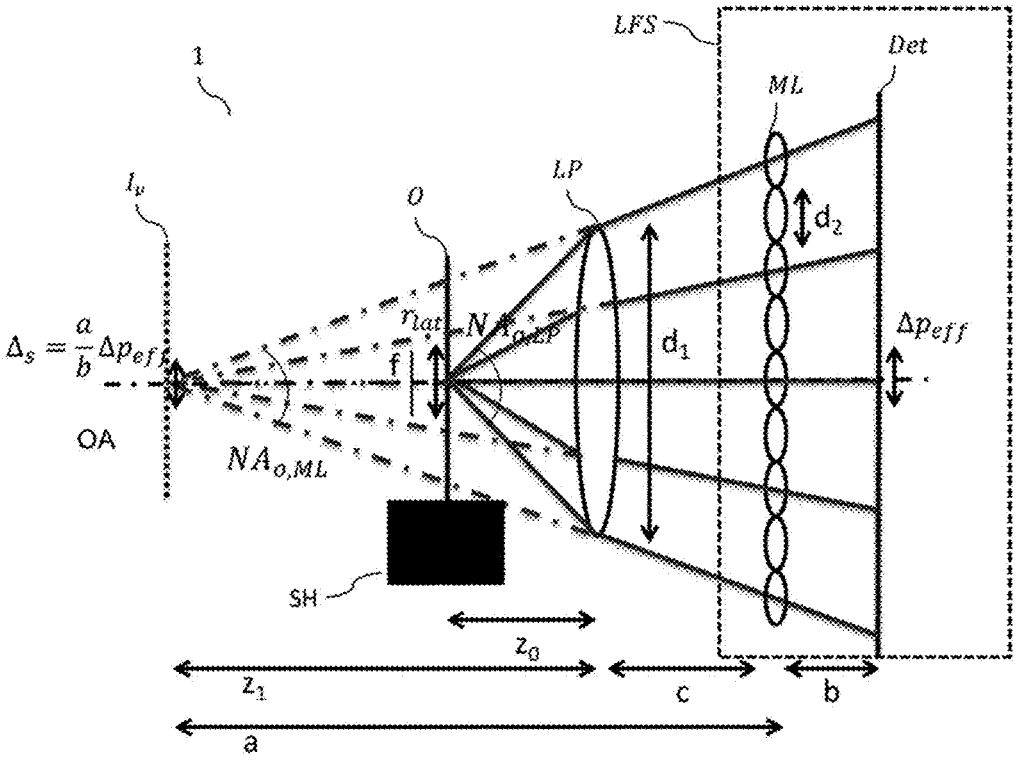

FIG. 2 illustrates a plenoptic imaging device 1 according to the invention, for forming an image of the light field of an object O, that is particularly suitable for operating in the X-ray domain. It will be recalled that, by "image of the light field", what is meant is an image containing both information on the intensity of the light field and information on the direction of the rays forming the light field. To produce this image, just like prior-art devices, the plenoptic imaging device according to the invention comprises a main optical assembly LP and a light-field-sampling assembly LFS. In addition, the device 1 comprises a sample holder SH configured to hold the object O in place.

The main optical assembly LP, of optical axis OA, is arranged to focus rays of the light field of the object. The assembly LP is placed at an object distance $z_0$ from the sample holder SH that is less than an object focal distance $f_1$ of the main optical assembly LP. Thus, the assembly LP forms an intermediate virtual image $I_v$ of the object at a distance $z_1$ from the optical assembly in an intermediate image plane. The magnification of the main optical assembly LP is $M=z_1/z_0$. The main optical assembly LP is an objective formed from a set of one or more optical components that, depending on the wavelength of the rays forming the light field of the object, are either refractive or diffractive.

Unlike prior-art plenoptic devices, the distance $z_0$ is less than the object focal length $f_1$. This choice allows the object numerical aperture $NA_{o,Lp}$ of the main optical assembly to be increased. As will be explained below, this has two advantages compared to prior-art plenoptic imaging devices in focused configuration forming an image on the image side of the main lens: an improved angular resolution and a better lateral and longitudinal resolution. Compared to a prior-art plenoptic imaging device in conventional configuration, lateral and longitudinal resolution is improved. For the sake of clarity, "longitudinal resolution" corresponds to the minimum distance separating two object planes reconstructable by the device, the planes being perpendicular to the optical axis OA.

Lastly, the device comprises a light-field-sampling assembly LFS configured to acquire spatio-directional information of the rays forming the virtual image and to form the image of the light field. This assembly LFS is known to those skilled in the art. According to one preferred embodiment of the invention, illustrated in FIG. 2, this assembly comprises a matrix-array photodetector Det and a microlens array ML. The array ML comprises identical microlenses, of diameter $d_2$ and of focal length $f_2$. By way of non-limiting example, the photodetector Det may be a CCD or CMOS sensor, configured depending on a wavelength of the rays forming the light field of the object.

FIG. 2 illustrates various parameters of the device. The microlens array ML is arranged at a distance a from the intermediate image plane and the photodetector is arranged at a distance b from the microlens array. As in the focused configuration illustrated in FIG. 1D, in the device 1 of the invention, the photodetector Det is in a plane that is conjugated with the intermediate image plane by the microlens array, and hence $$\frac{1}{a} + \frac{1}{b} = \frac{1}{f_2}.$$

The magnification of each microlens is $$m = \frac{b}{a}.$$

Figure 3:
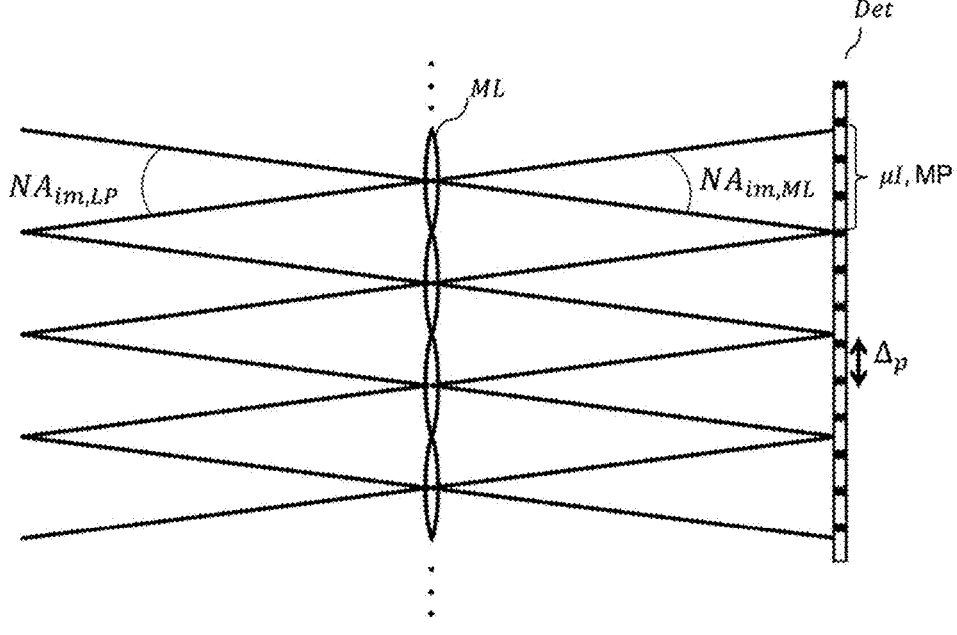

Each microlens of the array ML is configured to form a micro-image $\mu l$ of a respective portion of the virtual image $I_v$ of the object on a respective segment of the photodetector MP. This micro-image is not shown in FIG. 2 but is shown in FIG. 3. This segment MP of the photodetector (also called a macropixel) comprises a plurality of pixels. The set of micro-images together forms the image of the light field of the object.

Figure 1A:
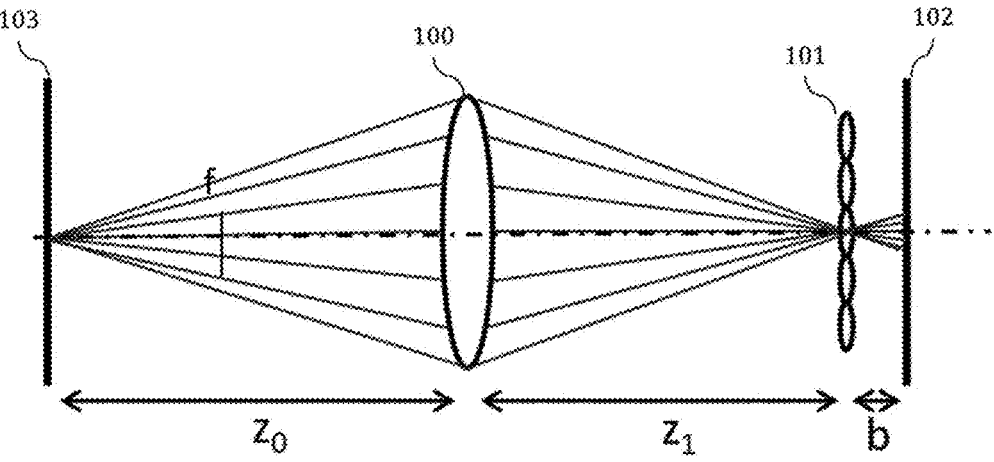
FIG. 1A a schematic view of a plenoptic imaging device known to those skilled in the art, FIG. 1B, a schematic view of rays forming a micro-image in a plenoptic imaging device known to those skilled in the art, FIG. 1C, an image of the light field acquired by a plenoptic imaging device known to those skilled in the art, FIG. 1D a schematic view of a plenoptic imaging device known to those skilled in the art, FIG. 2 a schematic view of a plenoptic imaging device according to the invention, FIG. 3 a representation of the numerical apertures of the main optical assembly and of an image numerical aperture of each microlens in the plenoptic imaging device according to the invention.
Figure 1B:
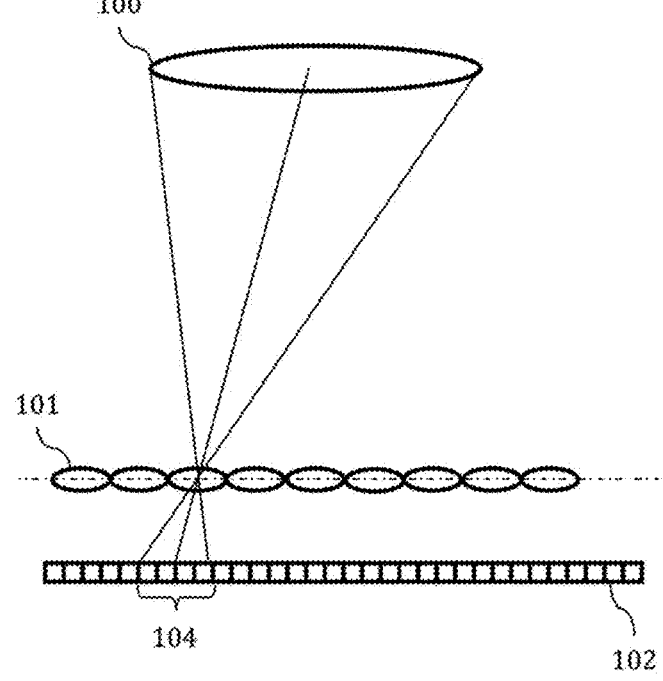
Figure 1C:
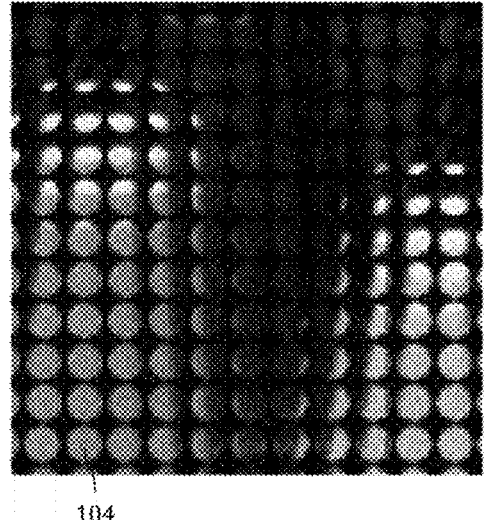
Figure 1D:
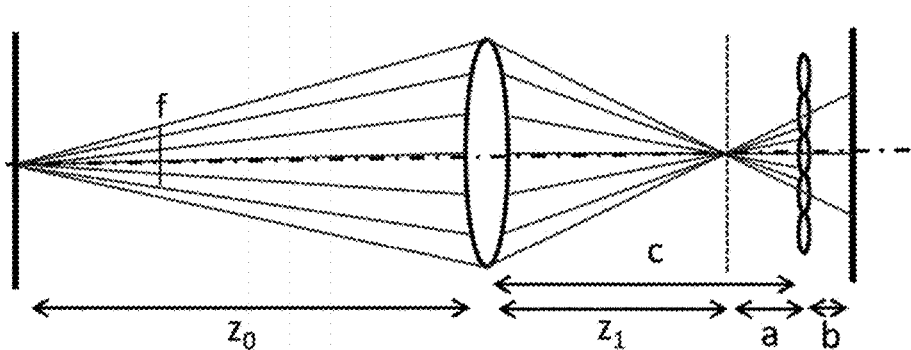

The device of the invention is an evolution of the prior-art device in focused configuration illustrated in FIG. 1D. In the following section, details will be given as to how this evolution allows certain parameters of the device of the invention to be improved.

In the device of the invention, as in a prior-art device in focused configuration, lateral resolution is given by the maximum value of 3 dimensions representing diffraction by the main optical assembly, diffraction by each microlens and the size of a pixel of the photodetector. In the intermediate image plane, the resolution as a result of diffraction by the main assembly, according to Sparrow's resolution limit, is $$R_{obj} = \frac{0.47\lambda}{NA_{o,LP}} \times M,$$

with $\lambda$ the wavelength of the rays forming the light field. Likewise, in the plane of the photodetector, the resolution as a result of diffraction by a microlens, according to Sparrow's resolution limit, is $$r_{obj} = \frac{0.47\lambda}{NA_{o,ML}} \times m,$$

with $NA_{o,ML}$ an object numerical aperture of a microlens. By comparing these dimensions in the photodetector space, an effective pixel size $\Delta p_{eff}$ is obtained that is equal to:

$$\Delta p_{eff} = \max(m.R_{obj} ; r_{obj} ; \Delta_p) \tag{Eq1}$$

Assuming that pixel size is not the factor limiting resolution and considering the object space of the main lens, the lateral resolution $r_{lat}$ of the device is then equal to:

$$r_{lat} = \frac{\max(m.R_{obj}; r_{obj})}{M \times m}. \tag{Eq2}$$

Likewise, it can be proved that longitudinal resolution is equal to:

$$r_{long} = \frac{r_{lat}}{NA_{o,LP}} + \frac{\lambda}{NA_{o,LP}^2}. \tag{Eq3}$$

In order to compare the lateral and longitudinal resolutions of the device of the invention and the prior-art device in focused configuration, it is therefore necessary to compare how the various parameters of equations Eq2 and Eq3 vary.

The main optical assembly of prior-art plenoptic imaging devices in focused configuration has a magnification $M=z_1/z_0$ lower than that of the invention (because $z_0$ is smaller in the invention and $z_1$ is larger in the invention). However, they have a magnification $m=b/a$ higher than the invention. Furthermore, the device of the invention possesses a smaller aperture $NA_{o,ML}$ and a larger aperture $NA_{o,LP}$ than the prior-art device in focused configuration.

In the device of the invention, the microlens array is preferably configured so that the lateral resolution $r_{lat}$ is set by $R_{obj}$, i.e. so that $m.R_{obj} > r_{obj}$. Thus, the lateral resolution is equal to $$r_{lat} = \frac{0.47\lambda}{m \times NA_{o,LP}}.$$

In order tor the device of the invention to allow an improvement in the lateral resolution $r_{lat}$ with respect to the prior-art device in focused configuration, it is necessary for the product $m \times NA_{o,LP}$ to remain higher than 1 when passing from a prior-art device in focused configuration to the device of the invention. This amounts to choosing the distance b in the invention such that $m \times NA_{o,Lp}$ remains greater than 1 when passing from a prior-art device in focused configuration to the device of the invention, or indeed such that $b > a \times d_1$.

From equation Eq3 it should be clear that the device of the invention allows longitudinal resolution to be greatly improved with respect to the prior-art device in focused configuration, when the lateral resolution flat is also decreased.

Angular resolution will now be considered. It will be recalled that angular resolution corresponds to the number of different angular components—i.e. directions—collected for each spatial position. For a given spatial position in the intermediate image plane, the associated directions are distributed over a plurality of microlenses (see FIG. 2). Thus, estimating angular resolution amounts to estimating the number of microlenses that pick up these directions. In the device of the invention and in a prior-art device in focused configuration, the angular resolution $N_u$ is given by the following relationship:

$$N_u = (d_1 a)/(z_1 d_2). \qquad \text{(Eq4)}$$

By definition $$a = c - z_1 <=> \frac{a}{z_1} = \frac{c}{z_1} - 1,$$

with c the distance between the microlens array and the main optical assembly (see FIG. 2). It may be deduced from Eq4 that angular resolution is increased by virtue of the configuration of the invention, with respect to the angular resolution of a prior-art device in focused configuration, if $c > 2z_1$.

The plenoptic depth of field corresponds to the depth range over which it is possible to reconstruct a sharp image from a single acquisition. In the device of the invention and in a prior-art device in focused configuration, the plenoptic depth of field $DOF_p$ is given by the following relationship:

$$DOF_p = N_u \frac{r_{lat}}{NA_{o,LP}} + \frac{\lambda}{NA_{o,LP}^2}. \qquad \text{(Eq5)}$$

Equation 5 implies that, with a suitable geometry, when the device of the invention allows angular resolution $N_u$ to be increased more than lateral resolution $r_{lat}$ is decreased, the plenoptic depth of field increases compared to that of a device in focused configuration, on account of its larger aperture $NA_{o,LP}$.

Thus, by means of a suitable optical set-up, the optical device of the invention allows lateral, longitudinal and angular resolution and depth of field to be improved compared to a prior-art device in focused configuration. In the field of plenoptic imaging by X-rays, this partially circumvents the limitation created by the low numerical aperture of the optics commonly used.

Furthermore, the device of the invention is more compact than a prior-art device in focused configuration, because the distance b is decreased.

In the device of the invention, it is desirable to avoid overlap of the micro-images in the plane of the photodetector, as this would induce a loss of spatio-directional information and would hinder focused reconstruction of the image. Hence, it is necessary for an image numerical aperture $NA_{im,LP}$ of the main optical assembly to be less than or equal to an image numerical aperture $NA_{im,ML}$ of each microlens. FIG. 3 illustrates the preferred embodiment of the invention, wherein the image numerical aperture $NA_{im,LP}$ of the main optical assembly is equal to the image numerical aperture $NA_{im,ML}$ of each microlens. To this end, in this embodiment, $$\frac{d_1}{z_1 + a + b} = \frac{d_2}{b}.$$

Thus, the micro-images are adjacent in the plane of the photodetector and the use of the number of pixels of the photodetector is optimized. It will be noted that the above equality is different from the one given in the prior art (see for example Todor Georgiev and Andrew Lumsdaine. Reducing plenoptic camera artifacts. Computer Graphics Forum, 29 (6): 1955-1968, 2010.) which made the approximation $z_1 << a$, b, which is incorrect in the device of the invention.

According to one preferred embodiment of the invention, the sample holder SH is configured to be moved with respect to the main optical assembly. Furthermore, preferably, the microlens array and the photodetector are mounted on respective translation stages. This embodiment makes it possible to easily control the distances $z_0$, c and b and therefore makes it possible to modify the resolutions and plenoptic depth of field of the device.

According to one embodiment of the invention, the main optical assembly and the microlens array are configured for X-rays (from about 0.01 nm to 10 nm). For example, the microlens array is formed by an array of Fresnel zone plates, and the main optical assembly comprises one or more Fresnel zone plates or a photon sieve. By photon sieve, what is meant here is a membrane that is opaque to radiation and that contains a plurality of apertures suitably arranged in the Fresnel zone of a beam, so as to focus it to a size smaller than the size of the apertures through constructive and destructive interference of light diffracted by the apertures (see for example Kipp, L., Skibowski, M., Johnson, R. L., Berndt, R., Adelung, R., Harm, S. & Seemann, R. (2001). Sharper images by focusing soft X-rays with photon sieves. *Nature*, 414 (6860), 184-188.).

Alternatively, according to another embodiment, the main optical assembly comprises one or more refractive lenses and the microlens array comprises a plurality of refractive lenses.

According to one embodiment of the invention, the device 1 comprises a processor connected to the photodetector and configured to implement a refocusing algorithm allowing a depth image or a 3D image of the object to be reconstructed from the image of the light field. Specifically, when the object is partially transparent to the radiation irradiating it, it is possible to reconstruct the internal structure of the object by refocusing a 2D image of the sample in various planes perpendicular to the optical axis and each separated by a distance corresponding to the longitudinal resolution. Refocusing algorithms are not the subject of the invention and are known to those skilled in the art (see Ren Ng. Digital Light Field Photography. PhD thesis, Stanford University, CA, USA, 2006. AAI3219345 or Lumsdaine, A. & Georgiev, T. (2009 April). The focused plenoptic camera. in 2009 *IEEE International Conference on Computational Photography* (*ICCP*) (pp. 1-8). IEEE).

According to another embodiment of the invention, different from that illustrated in FIG. 2, the light-field-sampling assembly LFS comprises a matrix array of circular apertures instead of a microlens array. In this case, the micro-images are formed by the circular apertures on the photodetector, provided that the diameter $d_2$ of the apertures permits it. In a manner known per se, it is preferable for the diameter $d_2$ of the apertures to be $d_2 = 1.562\sqrt{b\lambda}$ to within ±10%.

Another subject of the invention is a method of use of a plenoptic imaging device comprising a main optical assembly LP and a light-field-sampling assembly LFS. This method comprises the following steps:

placing the device so that the distance $z_0$ between the object to be imaged and said main optical assembly is less than the object focal length $f_1$ of the main optical assembly, so as to form the intermediate virtual image $I_v$ placed on the object side of the main optical assembly, acquiring, with the light-field-sampling assembly, spatio-directional information of the rays forming the virtual image in order to form the image of the light field of the object.

As explained above, this method allows the object numerical aperture $NA_{o,LP}$ of the main lens to be increased, this allowing, depending on the configuration of the device, the various resolutions of the device and the plenoptic depth of field to be increased.

The invention claimed is:

1. A plenoptic imaging device for forming an image of the light field of an object (O), comprising:

a sample holder (SH) configured to hold said object, a main optical assembly (LP), arranged to focus rays of the light field of said object, at a distance $z_o$ called the object distance from the sample holder less than an object focal distance $f_1$ of said main optical assembly, so as to form an intermediate virtual image $(I_v)$ of said object in an intermediate image plane at a distance $z_1$ from said optical assembly, a light-field-sampling assembly (LFS) configured to acquire spatio-directional information of the rays forming the virtual image and to form said image of the light field, said light-field-sampling assembly comprising:

a matrix-array photodetector (Det)

a microlens array (ML) arranged at a distance a from the intermediate image plane, the photodetector being arranged at a distance b from the microlens array, each microlens being of diameter $d_2$ and having a focal length $f_2$ and being configured to form a micro-image $(\mu_i)$ of a respective portion of the virtual image of the object on a respective segment of the photodetector, each said segment comprising a plurality of pixels, the micro-images forming said image of the light field, wherein an image numerical aperture $NA_{im,Lp}$ of the main optical assembly is less than or equal to an image numerical aperture $NA_{im,ML}$ of each microlens.

2. The device as claimed in claim 1, wherein the photodetector is in a plane that is conjugated with the intermediate image plane by the microlens array.

3. The device as claimed in claim 1, wherein $$\frac{d_1}{z_{1+a+b}} = \frac{d_2}{b},$$

with $d_1$ the diameter of the aperture of the main optical assembly.

4. The device as claimed in claim 1, wherein a distance c between the microlens array and the main optical assembly is greater than said distance $z_1$.

5. The device as claimed in claim 1, comprising a processor configured to implement a refocusing algorithm allowing a depth image or a 3D image of the object to be reconstructed from said image of the light field.

6. The device as claimed in claim 1, wherein the main optical assembly and the microlens array are configured for X-rays.

7. The device as claimed in claim 6, wherein the main optical assembly is a photon sieve.

8. The device as claimed in claim 6, comprising an X-ray source irradiating said object so as to form said light field of the object.

9. A method of use of a plenoptic imaging device, comprising a main optical assembly (LP) and a light-field-sampling assembly (LFS), according to claim 1, said method comprising the following steps:

A. placing said device so that a distance zo called the object distance between an object to be imaged and said main optical assembly is less than an object focal length $f_1$ of said main optical assembly so as to form an intermediate virtual image $(I_v)$, B. acquiring, with the light-field-sampling assembly, spatio-directional information of the rays forming the virtual image in order to form an image of the light field of the object.

* * * * *